US008958628B2

(12) United States Patent
Chauvier et al.

(10) Patent No.: US 8,958,628 B2
(45) Date of Patent: Feb. 17, 2015

(54) IMAGE SCALING (75) Inventors: Laurent Chauvier, Villeneuve-la-Guyard (FR); Kevin A. Murray, Fordingbridge (GB); Simon John Parnall, Kingswood (GB); Ray Taylor, Hampshire (GB); James Geoffrey Walker, Winchester (GB)

(73) Assignee: Cisco Technology Inc., San Jose, CA (US)

( * ) Notice: Subject to any disclaimer, the term of this patent is extended or adjusted under 35 U.S.C. 154(b) by 204 days.

(21) Appl. No.: 13/642,051

(22) PCT Filed: Apr. 12, 2011

(86) PCT No.: PCT/IB2011/051571
§ 371 (c)(1),
(2), (4) Date: Nov. 26, 2012

(87) PCT Pub. No.: WO2011/132115
PCT Pub. Date: Oct. 27, 2011

(65) Prior Publication Data

US 2013/0077853 A1    Mar. 28, 2013
US 2013/0279797 A9    Oct. 24, 2013

(30) Foreign Application Priority Data

Apr. 23, 2010 (GB) ................................. 1006800.5

(51) Int. Cl.
G06K 9/00 (2006.01)
G06T 19/20 (2011.01)
(Continued)

(52) U.S. Cl.
CPC ............ *G06T 19/20* (2013.01); *H04N 13/0022* (2013.01); *H04N 13/0029* (2013.01);
(Continued)

(58) Field of Classification Search
None
See application file for complete search history.

(56) References Cited

U.S. PATENT DOCUMENTS 4,882,679 A    11/1989    Tuy et al.
6,795,241 B1    9/2004    Holzbach
(Continued)

FOREIGN PATENT DOCUMENTS

WO    WO 2005/060271 A1    6/2005
WO    WO 2005/084298 A2    9/2005

OTHER PUBLICATIONS

Aug. 29, 2011 Transmittal of International Search Report and Written Opinion of the International Searching Authority.
(Continued)

*Primary Examiner* — Stephen R Koziol
*Assistant Examiner* — Amandeep Saini
(74) *Attorney, Agent, or Firm* — Husch Blackwell LLP (57) ABSTRACT The present invention relates to an apparatus, method for adjusting depth characteristics of a three-dimensional image for correcting for errors in perceived depth when scaling the three-dimensional image, the method comprising: receiving three-dimensional image information comprising a stereoscopic image including a first image and a second image, the stereoscopic image having depth characteristics associated with an offset of the first and second images; determining a scaling factor indicative of a scaling for converting the stereoscopic image from an original target size to a new size; determining at least one shifting factor for varying the depth characteristics, the at least one shifting factor indicative of a relative shift to be applied between the first and the second images, wherein the at least one shifting factor is determined in accordance with the scaling factor and at least one depth parameter derived from the depth characteristics; and performing the relative shift between the first and second images in accordance with the shifting factor for adjusting the offset of the first and second images.

35 Claims, 2 Drawing Sheets (51) Int. Cl.
*H04N 13/00* (2006.01)
*G06T 5/00* (2006.01)
*G06T 5/40* (2006.01)
*G06T 3/40* (2006.01)

(52) U.S. Cl.
CPC . *G06T5/006* (2013.01); *G06T 5/40* (2013.01); *G06T 3/40* (2013.01); *G06T 2207/10021* (2013.01); *G06T 2207/10028* (2013.01)
USPC .......................................................... 382/154

(56) References Cited

U.S. PATENT DOCUMENTS

| | | |
|---|---|---|
| 2001/0045979 A1 | 11/2001 | Matsumoto et al. |
| 2004/0114806 A1 | 6/2004 | Katayama et al. |
| 2005/0099414 A1 | 5/2005 | Kaye et al. |
| 2005/0159886 A1 | 7/2005 | Kim |
| 2005/0190180 A1 | 9/2005 | Jin et al. |
| 2006/0197783 A1 | 9/2006 | Redert |
| 2006/0203085 A1 | 9/2006 | Tomita |
| 2007/0003134 A1* | 1/2007 | Song et al. .................. 382/154 |
| 2010/0103249 A1 | 4/2010 | Lipton et al. |

OTHER PUBLICATIONS

Mark F. Bradshaw et al., "The Effect of Display Size on Disparity Scaling From Differential Perspective and Vergence Cues," *Vision Res.*, vol. 36, No. 9, pp. 1255-1264 (1996).

Graham Jones et al., "Controlling Perceived Depth in Stereoscopic Images" (2001).

P. Kauff et al., "Depth Map Creation and Image-Based Rendering for Advanced 3DTV Services Providing Interoperability and Scalability," *Signal Processing: Image Communication*, vol. 22, pp. 217-234 (2007).

Donghyun Kim et al., "Depth Map Quality Metric for Three-Dimensional Video," *SPIE*, vol. 7237 (2009).

Hye Jin Kim et al., "Reconstruction of Stereoscopic Imagery for Visual Comfort," *SPIE*, vol. 6803 (2008).

Geng Sun et al., "Evaluating Methods for Controlling Depth Perception in Stereoscopic Cinematography," (Society of Photo-Optical Instrumentation Engineers 2009).

* cited by examiner

IMAGE SCALING

RELATED APPLICATION INFORMATION

The present application is a 35 USC §371 application of PCT/IB2011/051571, filed on 12 Apr. 2011 and entitled "Image Scaling", which was published on 27 Oct. 2011 in the English language with International Publication Number WO/2011/132115, and which claims the priority of United Kingdom Patent Application No. GB 1006800.5 of NDS Limited, filed 23 Apr. 2010.

FIELD OF THE INVENTION

The present invention relates to a method, apparatus, and computer program product for use in image scaling. In particular, the present invention relates to depth perceptive correction of scaled stereoscopic three-dimensional images on different sized displays.

BACKGROUND OF THE INVENTION

Display technologies are integral to most electronic devices, being used both for watching media such as television or films and for graphical user interfaces for computers, mobile phones and other electronic devices.

In recent years, the use of three-dimensional technology in such displays has been gathering momentum. In particular, the use of such three-dimensional technologies for television broadcasting has become of particular interest. The basic technology behind three-dimensional imaging is well known and well established, dating back to the early 1900s. Three-dimensional moving images have also been around for many years, but have not yet been utilised much in consumer electronic devices.

Three-dimensional imaging works by tricking the eye into perceiving depth information through two or more images. There are various established techniques for achieving this, the most popular of which utilise two images and are called stereoscopic techniques. Stereoscopic techniques utilised for moving images such as television involve displaying each image to be viewed by the viewer as two images; one image arranged to be viewed by the right eye and one image arranged to be viewed by the left eye.

The left and right images differ slightly such that when they reach each eye the viewer can extract depth information from the images. Such depth information is created using two (slightly) different images. Each portion of the left and right images contains views of objects that are captured from subtly different perspectives. As a result, the offset of the views differ by a certain number of pixels, in accordance with the depth to be perceived by the viewer.

In order to allow for such a three-dimensional imaging technique to work, a mechanism is required to separate the images for the left eye from images for the right eye. There are several such techniques. One technique is to display the images alternately in quick succession and use a mechanism synchronized to the display to control which eye sees the display only when the appropriate image is displayed. Other techniques include the use of passive polarization glasses and a polarized display, which allow each eye to see part of the screen for all of the time.

When broadcasting three-dimensional images, for example as part of television broadcast, the perception of depth that is associated with three-dimensional images is achieved by a pair of similar two-dimensional images captured from slightly different perspectives and thus slightly offset from each other. The offset of the two images, which in turn determines the perceived depth of the image, is determined in accordance with a fixed image size before transmission. For example, the depth may be determined for displaying on a 48-inch television. If the received television signal is then displayed on a 32-inch television, the image information will be scaled by ⅔rds for being displayed on the 32-inch television.

SUMMARY OF THE INVENTION

It has been noted by the inventors of the present invention that the perception of depth does not scale proportionally to the scaling of the screen size. The closer an object is perceived as being to a screen, the smaller the variation in perceived depth that occurs when scaling an image. By comparison, the further an object is perceived as being away from the screen the larger the perceived depth will be altered simply by changing the size of the images. Referring to the previous example, where the televisions' sizes changes from 48 inch to 32 inch, and therefore scaled by ⅔rds, the perceived depths are not scaled consistently or scaled by ⅔rds (except for one unique depth). Consequently, the depth information is distorted when scaling three-dimensional image pairs.

One solution is to transmit multiple signals corresponding to different image sizes.

There is provided in accordance with an embodiment of the present invention a method for adjusting depth characteristics of a three-dimensional image for correcting for errors in perceived depth when scaling the three-dimensional image, the method comprising: receiving three-dimensional image information comprising a stereoscopic image including a first image and a second image, the stereoscopic image having depth characteristics associated with an offset of the first and second images; determining a scaling factor indicative of a scaling for converting the stereoscopic image from an original target size to a new size; determining at least one shifting factor for varying the depth characteristics, the at least one shifting factor indicative of a relative shift to be applied between the first and the second images, wherein the at least one shifting factor is determined in accordance with the scaling factor and at least one depth parameter derived from the depth characteristics; and performing the relative shift between the first and second images in accordance with the shifting factor for adjusting the offset of the first and second images.

Further, in accordance with an embodiment of the present invention, the at least one depth parameter used to determine the at least one shifting factor relates to a variation in the depth of the stereoscopic image.

Still further, in accordance with an embodiment of the present invention, the variation corresponds to an average variation in the depth of the stereoscopic image.

Additionally, in accordance with an embodiment of the present invention, the average variation is determined in accordance with the following equation:

$$\left(\frac{\text{maximum disparity} + \text{minimum disparity}}{2}\right) \times (1 - \text{scaling factor})$$

wherein the disparity is a measure of an offset between a pixel in the first and second images of the stereoscopic image.

Moreover, in accordance with an embodiment of the present invention, the average variation is determined in the depth domain and transformed to the disparity domain for determining the shifting factor.

Further, in accordance with an embodiment of the present invention, the at least one shifting factor is determined by an iterative process for minimising errors in the offset of the first and second images of the stereoscopic image when scaling the stereoscopic image.

Still further, in accordance with an embodiment of the present invention, the iterative process utilises information related to the usage of different depth values.

Additionally, in accordance with an embodiment of the present invention, the at least one depth parameter used to determine the at least one shifting factor includes a parameter indicating a most common depth of the depth characteristics of the stereoscopic image.

Moreover, in accordance with an embodiment of the present invention, the three-dimensional image information includes the at least one depth parameter.

Further, in accordance with an embodiment of the present invention, the stereoscopic image comprises a plurality of regions and the step of determining the at least one shifting factor further comprises determining a shifting factor for one or more of the regions, and the step of performing a relative shift further comprises performing a relative shift for each of the one or more regions in accordance with the shifting factor determined for each respective one or more region.

Still further, in accordance with an embodiment of the present invention, the step of determining the shifting factor further comprises splitting the stereoscopic image into regions.

Additionally, in accordance with an embodiment of the present invention, the three-dimensional image information includes information defining the regions of the stereoscopic image.

Moreover, in accordance with an embodiment of the present invention, the method further comprises performing a smoothing operation on boundaries between regions.

Further, in accordance with an embodiment of the present invention, the smoothing operation involves low-pass filtering.

Still further, in accordance with an embodiment of the present invention, the method further comprises receiving further three-dimensional image information comprising a further stereoscopic image including a first image and a second image, the further stereoscopic image having depth characteristics associated with an offset of the first and second images of the further stereoscopic image, wherein the stereoscopic image and the further stereoscopic image correspond to frames of a stream of image information and the further stereoscopic image corresponds to a frame of the stream preceding the further stereoscopic image; and performing a smoothing operation on the depth characteristics in order to smooth the transition of depth characteristics between frames.

Additionally, in accordance with an embodiment of the present invention, the smoothing operation comprises applying a low pass filter to the depth information.

Moreover, in accordance with an embodiment of the present invention, the depth parameters are determined in accordance with a depth map included in the three-dimensional image information, the depth map indicating a relative offset between the first and the second images at a plurality of points across the stereoscopic image.

Further, in accordance with an embodiment of the present invention, the method further comprises generating a depth map from the stereoscopic image, wherein the depth parameters are determined in accordance with the depth map, the depth map indicating a relative offset between the first and the second images at a plurality of points across the stereoscopic image.

Still further, in accordance with an embodiment of the present invention, the three-dimensional image information is received over a network from a headend.

Additionally, in accordance with an embodiment of the present invention, the first and second images are each shifted relative to one another by half of the shifting factor for correcting depth perception due to scaling of the three-dimensional image.

In accordance with a further embodiment of the invention there is provided an apparatus for adjusting depth characteristics of a three-dimensional image for correcting for errors in perceived depth when scaling the three-dimensional image, the apparatus comprising: an input port arranged to receive three-dimensional image information comprising a stereoscopic image including a first image and a second image, the stereoscopic image having depth characteristics associated with an offset of the first and second images; and a processor arranged to: determine a scaling factor indicative of a scaling for converting the stereoscopic image from an original target size to a new size; determine at least one shifting factor for varying the depth characteristics, the at least one shifting factor indicative of a relative shift to be applied between the first and the second images, wherein the at least one shifting factor is determined in accordance with the scaling factor and at least one depth parameter derived from the depth characteristics; and perform the relative shift between the first and second images in accordance with the shifting factor for adjusting the offset of the first and second images.

Further, in accordance with an embodiment of the present invention, the at least one depth parameter used to determine the at least one shifting factor relates to a variation in the depth of the stereoscopic image.

Still further, in accordance with an embodiment of the present invention, the variation corresponds to an average variation in the depth of the stereoscopic image.

Additionally, in accordance with an embodiment of the present invention, the processor determines the average variation in accordance with the following equation:

$$\left(\frac{\text{maximum disparity} + \text{minimum disparity}}{2}\right) \times (1 - \text{scaling factor})$$

wherein the disparity is a measure of an offset between a pixel in the first and second images of the stereoscopic image.

Still further, in accordance with an embodiment of the present invention, the processor determines the average variation in the depth domain and transforms the average variation to the disparity domain for determining the shifting factor.

Additionally, in accordance with an embodiment of the present invention, the processor determines the at least one shifting factor by an iterative process for minimising errors in the offset of the first and second images of the stereoscopic image when scaling the stereoscopic image.

Moreover, in accordance with an embodiment of the present invention, the iterative process utilises information related to the usage of different depth values.

Further, in accordance with an embodiment of the present invention, the at least one depth parameter used to determine the at least one shifting factor includes a parameter indicating a most common depth of the depth characteristics of the stereoscopic image.

Still further, in accordance with an embodiment of the present invention, the three-dimensional image information includes the at least one depth parameter.

Additionally, in accordance with an embodiment of the present invention, the stereoscopic image comprises a plurality of regions and the processor determines a shifting factor for one or more of the regions, and performs the relative shift for each of the one or more regions in accordance with the shifting factor determined for each respective one or more region.

Moreover, in accordance with an embodiment of the present invention, the processor determines the shifting factor by splitting the stereoscopic image into regions.

Further, in accordance with an embodiment of the present invention, the three-dimensional image information includes information defining the regions of the stereoscopic image.

Still further, in accordance with an embodiment of the present invention, the processor is further arranged to perform a smoothing operation on boundaries between regions.

Additionally, in accordance with an embodiment of the present invention, the smoothing operation involves low-pass filtering.

Moreover, in accordance with an embodiment of the present invention, the apparatus is further arranged to: receive further three-dimensional image information comprising a further stereoscopic image including a first image and a second image, the further stereoscopic image having depth characteristics associated with an offset of the first and second images of the further stereoscopic image, wherein the stereoscopic image and the further stereoscopic image correspond to frames of a stream of image information and the further stereoscopic image corresponds to a frame of the stream preceding the further stereoscopic image; and perform a smoothing operation on the depth characteristics in order to smooth the transition of depth characteristics between frames.

Further, in accordance with an embodiment of the present invention, the smoothing operation comprises applying a low pass filter to the depth information.

Still further, in accordance with an embodiment of the present invention, the processor determines the depth parameters in accordance with a depth map included in the three-dimensional image information, the depth map indicating a relative offset between the first and the second images at a plurality of points across the stereoscopic image.

Additionally, in accordance with an embodiment of the present invention, the processor is further arranged to generate a depth map from the stereoscopic image, wherein the depth parameters are determined in accordance with the depth map, the depth map indicating a relative offset between the first and the second images at a plurality of points across the stereoscopic image.

Moreover, in accordance with an embodiment of the present invention, the three-dimensional image information is received over a network from a headend.

Further, in accordance with an embodiment of the present invention, the processor is arranged to shift the first and second images relative to one another by half of the shifting factor for correcting depth perception due to scaling of the three-dimensional image.

In accordance with yet another embodiment of the invention there is provided a carrier medium carrying computer readable code for controlling a suitable computer to carry out the method as described above.

In accordance with a further embodiment of the invention there is provided a carrier medium carrying computer readable code for configuring a suitable computer as the apparatus as described above.

Embodiments of the invention provide an easy and cost effective means for adjusting the depth characteristics of an image when varying the image size. In particular, embodiments of the invention provide a means for adjusting the depth characteristics with a minimum amount of processing.

Embodiments of the invention globally shift the stereoscopic images to compensate for errors in depth characteristics. Furthermore, the global shift aims to take into consideration characteristics of the image. Such characteristics could include the maximum and minimum depth values. Alternatively, the average or most common depth value could be utilised in order to minimise the errors in depth seen across the image. Furthermore, it would also be possible to attempt to minimise errors in those depths that will be most noticeable to the viewer, such as those perceived as being close to the viewer.

Embodiments of the present invention provide improved depth shifting compensation techniques. Such improvements involve splitting the image into portions or sections, and applying appropriate techniques to portions/sections of the image. For example, more complex depth compensation could be applied to those portions that are of visual significance to the viewer. This would therefore allow for savings in terms of processing power to be achieved for portions of little significance, as a simple cost-efficient processing means could be applied to those portions. Further techniques leading to further improvements in such depth perspective correction include smoothing of images for errors both between portions and between image frames.

BRIEF DESCRIPTION OF THE DRAWINGS

The present invention will be understood and appreciated more fully from the following detailed description, taken in conjunction with the drawings in which.

In the description and drawings like reference numerals refer to like parts.

DETAILED DESCRIPTION OF EMBODIMENTS

Figure 1:
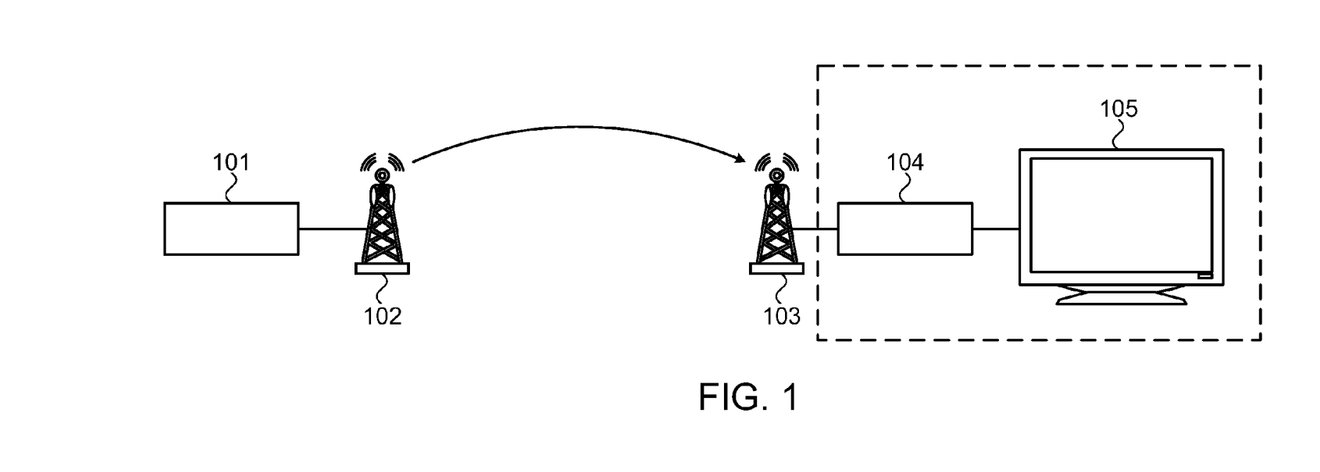
FIG. 1 is an illustration of a system constructed and operative in accordance with an embodiment of the present invention.

Reference is now made to FIG. 1, which provides an overview of the system of a first embodiment of the present invention.

In FIG. 1, a television broadcaster 101 provides a three-dimensional image, represented as a pair of two-dimensional images, to be transmitted to a transmitter 102, which then transmits the three-dimensional image as a wireless signal to a receiver 103. The television broadcaster 101 and transmitter 102 shall hereinafter be referred to as the head-end 101, 102 of the system.

The receiver 103 is connected to a set-top box 104. The set-top box 104 then performs any required processing on the received signal. The processed signal is then provided to a display 105 for being displayed. The processing carried out by the set-top box will include means for compensating for the errors that occur when scaling the images of the received signal to the screen size of the display 105. The set-top box 104 is arranged to perform pre-display depth processing. Such pre-processing of the depth characteristics helps to minimise the distortion that occurs when scaling images, this is discussed in more detail below.

In order to fully appreciate how the set-top box performs such processing it is firstly necessary to fully appreciate the signal that is being processed. An overview of the stereoscopic image signal to be processed is therefore set out below.

In this first embodiment of the present invention, a stereoscopic three-dimensional image stream is transmitted in the form of a consecutive set of stereoscopic images, transmitted in the order to be viewed. Each stereoscopic image of the image stream comprises two images, one image arranged to be viewed by the left eye, and one image arranged to be viewed by the right eye. In this embodiment, the image to be viewed by the left eye is placed in the image stream before the image to be viewed by the right eye. However, it will be appreciated that this ordering could be reversed.

In alternative embodiments of the invention polarisation techniques or parallax barrier techniques may be used. For example, in the case of polarisation techniques both images of a stereoscopic image can be viewed simultaneously, and separation of the two images is achieved using polarised glasses rather than shutter glasses.

In accordance with embodiments of the invention, the perception of depth is achieved from two images that are both subtly different from each other and offset relative to one another. There is a specific pixel offset for pixels of the stereoscopic image. Pixels of the image to be observed are offset between the left and right images in terms of a number of pixels. A larger pixel offset results in a greater depth either behind or in front of the screen (depending on the direction of the offset).

Figure 2:
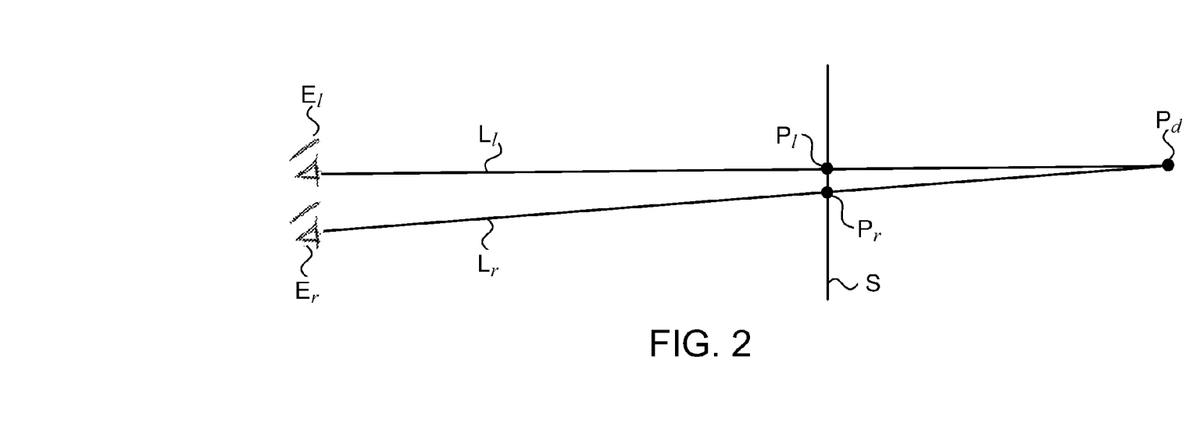
FIG. 2 shows a ray diagram illustrating how depth is perceived in a three-dimensional stereoscopic image.

The human visual system (HVS) interprets the location in depth of an object based on the relative offsets of the two images, with an absence of offset (i.e. a zero-offset) giving a depth location at the depth position of the screen. Image pixels typically represent part of one (or potentially more) objects, and the HVS matches the two object views from each eye. Among a number of cues used to determine depth is the binocular disparity that is the offset between the objects. This disparity calculation can be modelled as a ray diagram as shown in FIG. 2. FIG. 2 shows two intersecting lines $L_l$, $L_r$, one line $L_l$ passing through the left eye $E_l$ and a pixel $P_l$ intended to be viewed by the left eye $E_l$ and the other line passing through the right eye $E_r$ and the equivalent pixel $P_r$ intended to be viewed by the right eye $E_r$. The point of intersection $P_d$ then represents the depth at which the object is perceived.

The system of the first embodiment of the present invention aims to largely correct for distortions in the depth characteristics of a stereoscopic image when scaling a stereoscopic image in a simple manner, which minimises the processing required by the set-top box. In particular, this embodiment of the present invention achieves this by performing a linear global shift on pixels of the stereoscopic image pair. That is, pixels of the left and right images of the stereoscopic image are shifted with respect to one another by a fixed amount, which could be a non-integral value. Thus, when the stereoscopic image is displayed, the depth of the stereoscopic image is perceived as being relatively accurate.

When the presently described embodiment of the invention performs this shifting it takes into consideration the range of depths of the stereoscopic image, and shifts the stereoscopic image pairs in order to minimize the errors across the range. This is done by calculating a global offset that will position the average offset at the same value as on the original screen size. This offset is calculated by subtracting the average of the scaled offsets from the average of the original offsets. This can be summarized by the simplified equation 1:

$$\text{Pixel offset} = \quad \text{Equation 1}$$

$$(\text{Average Disparity(original)} - \text{Average Disparity(new)})$$

where:

$$\text{Average Disparity(Original)} =$$

$$\frac{(\text{min disparity(original)} + \text{max disparity(original)})}{2}$$

where:

$$\text{Average Disparity(new)} =$$

$$AverageDisparity(\text{original}) \times \text{scaling factor}$$

where the scaling factor is the ratio of the original display size to the new display size.

Equation 1 can then be simplified to:

$$\text{Pixel Offset} = \quad \text{Equation 1(a)}$$

$$\left(\frac{\text{max disparity(original)} + \text{min disparity(original)}}{2}\right) \times$$

$$(1 - \text{scaling factor})$$

Thus, a set-top box 104 provided with the minimum and maximum disparities and the original target screen size can calculate the relevant offset as it is able to interrogate the display 105 for its dimensions.

Performing this type of global shift provides a general compensation for the distortion of depth characteristics when the image is scaled to the new image display size. It will be appreciated that such a linear global shift is not accurate for all depths, but requires little processing compared to more complex non-linear shifts. Furthermore, the HVS does not always accurately recognise errors in depth. Consequently, such a procedure may be sufficient to make the depths appear accurate.

This simplistic averaging used as the basis of equation 1 does not take into account the non-linear relationship between pixel offset and depth calculation. Thus, an improved offset can be calculated by using a disparity offset that corresponds to the average depth (and not disparity) value. This depth based average disparity value can be summarized by equation 2:

$$\text{Pixel Offset} = \quad \text{Equation 2}$$

$$(\text{Average Disparity based on Depth (original)} -$$

$$\text{Average Disparity based on Depth (new)})$$

where:

$$\text{average disparity based on depth} =$$

$$\text{disparity(average depth)}$$

where:

$$\text{average depth} =$$

$$\frac{(\text{depth(min disparity)} + \text{depth(max disparity)})}{2}$$

-continued
where:

$$\text{disparity(depth)} = \text{i\_to\_disparity}\left(1 - \frac{1}{(\text{depth})}\right)$$

where:

$$\text{depth(disparity)} = \frac{1}{(1 - i(\text{disparity}))}$$

where:

$$i(\text{disparity}) = \text{disparity in pixels} \times \frac{\text{pixels per millimeter}}{\text{eye separation}}$$

where:

$$\text{i\_to\_disparity}(i) = \frac{(i \times \text{eye separation})}{\text{pixels per millimeter}}$$

where the eye separation is typically fixed at 6.5 cm.

The offset is then calculated such that the average value calculated by equation 2 on the scaled new image display is the same as the value calculated by equation 2 for the original target image display.

It will be appreciated that in the above calculations the geometric mean has been used to illustrate the average calculation. Other calculations for the average such as the mode or median, or non-geometric means, can equally be used.

Further improvements can be made by using a knowledge of the number of pixels that make use of a given disparity value, or depth value. This results in more information being transmitted because the set-top box uses this information to calculate the offset.

This method for depth perceptive correction of scaled stereoscopic three-dimensional images of the image stream in accordance with a first embodiment of the present invention shall now be explained with reference to FIG. 3. In particular, how the above-mentioned process is performed by the system of FIG. 1 shall be explained in detail.

Firstly, at step 201, maximum and minimum disparity values of the stereoscopic image are obtained, which represent the maximum and minimum depth of the stereoscopic image.

In this embodiment of the present invention the disparity values are generated at the head-end 101, 102. In particular, the head-end generates a disparity map, which is a comparison of the offsets of pixels in the left image of the stereoscopic image with corresponding pixels in the right image of the stereoscopic image. The disparity map provides the level of disparity as both positive and negative values, with the positive values representing pixels being perceived as protruding from the screen, and negative values representing pixels being perceived as being behind the screen. The larger the disparity value the larger the depth, i.e. for large disparities, the image will be perceived as closer to the viewer for positive values, and further away from the viewer for negative values.

The disparity map may be created by various techniques such as automated cross-correlation procedures, or least squares comparison based techniques. Such cross-correlation techniques provide an approximation of the offset, in pixels, by analysing the correspondence between the left and right images. While the approximation is generally quite accurate, errors do occur and it is often desirable to perform some correction for those errors. For example, the resultant noisy representation of the disparity can be filtered. A low-pass filter can reduce sudden unusual changes in disparity or depth, which are likely to be the result of an error. Furthermore, the resolution of the images can be reduced prior to generating the disparity map in order to reduce the amount of data to be processed and therefore reduce the likelihood of errors occurring. The disparity map therefore illustrates the disparity between the left and right images, which corresponds to the depth of the image.

In accordance with this embodiment of the invention, the head-end then analyses the disparity map in order to determine the maximum disparity and the minimum disparity. This involves searching for the maximum value. This can be done by looking at each value in turn and remembering the largest. The same is repeated for the smallest value. This is a pre-processing step performed prior to transmission by the head-end. The values that are extracted are later used by the set-top box in order to calculate the shift to apply to the pixels of the stereoscopic image when scaling the image for a new display size. The head-end, therefore, transmits the maximum and minimum disparity values as metadata with the stereoscopic image. Such metadata may be transmitted as a metadata stream synchronized to the video stream carrying the stereoscopic 3D image pairs, using techniques such as the one described in European Telecommunications Standard Institute (ETSI) Technical Specification (TS) 102 823 "Digial Video Broadcasting (DVB); Specification for the carriage of synchronised auxiliary data in DVB transport streams". It is noted that the disparity values and the disparity map correspond to a frame of the image stream. Hence, the metadata is associated with the specific stereoscopic image frame from which the data is derived.

Once the maximum and minimum disparity values are extracted from the stereoscopic image, and these values are sent across the network, the set-top box obtains the maximum and minimum disparity values from the metadata of the stereoscopic image.

The minimum and maximum disparity values are then averaged as described above. This may be an average in the disparity range, or corrected to correspond to the average in the depth range (as illustrated by equation 2), or may be a median value depending on the accuracy desired, the level of information available and the processing power available. The disparity result provides a representation of the amount of variation of the depth of the stereoscopic image. That is, the maximum and minimum depth values within the whole image provide an indication of the disparity range or depth range.

In alternative embodiments, the head-end performs the disparity map creation and initial processing of the disparity data prior to transmitting the data in order to reduce the quantity of information to be transmitted. Furthermore, performing this processing at the head-end also reduces the processing required at the set-top box. This processing may involve identification of maximum and minimum values and the averaging of them, or more complicated processing to produce alternative average values (e.g. rather than the geometric mean used for equations 1 and 2, they might use a non-geometric mean, or the mode or the median of the values), or reducing the disparity map to a value frequency histogram, as indicated by following descriptions.

In yet further alternative embodiments, the set-top box could perform all of this processing. That is, the set-top box can generate the disparity map and extract data from this map as required. Alternatively, the head-end can generate the disparity map and transmit the disparity map to the set-top box such that the set-top box can use the data of the disparity map as required for performing the depth adjustments. Deciding which of these alternative methods to use depends upon balancing where it is most preferable to perform the processing, and how important it is to minimise the amount of data transmitted across the network. The present embodiment of the invention being described aims to minimise the data transmitted across the network, and minimise the amount of processing carried out by the set-top box.

In order to perform the corrections as shown by equation 1 above, a scaling factor, corresponding to a scaling that will scale the image from its original target size to a new size, is also obtained.

Firstly, the set-top box obtains the original target image display size at step 203. In this embodiment of the invention, the original target image display size is obtained from the metadata of the stereoscopic image. The depth of the stereoscopic image, that is the offset between the left and right images of the stereoscopic image, is set for being displayed on a particular display size. Such setting of the image size ensures that the depth is perceived as being accurate by the viewer as already discussed. Hence, in order to allow for the scaling factor to be calculated, this original target image display size is typically provided in the metadata transmitted by the head-end and thus can be obtained by the set-top box.

While in this embodiment of the invention the original target image size is transmitted as metadata, in some alternative embodiments the size of transmitted image data is standardised such that the original target image display size is not provided within the metadata. Such embodiments therefore reduce the amount of data that is transmitted.

The set-top box obtains the new display size at step 203 by automated communication with the display. For example, an automated information request message is sent from the set-top box to the display. The request includes a request for information about the display, which includes the size of the screen. Once the display returns the screen size information to the set-top box, this information is stored within a memory of the set-top box. Hence, the set-top box will then store this information within its memory. In alternative embodiments, the set-top box obtains the new display size by means of input by the user, e.g. via a user display message in response to which the user is able to input the screen size.

In the next step of the process, step 204, the set-top box determines the ratio of the new image display size to the original target image display size. This ratio is representative of the scaling required to expand or shrink the image received by the set-top box to the new display size. Hence, this ratio shall also be referred to as the scaling factor. It is noted that a factor of less than 1.0 means that the new image display size is smaller than the original target image display size, and larger than 1.0 means the new image display size is larger than the original target image display size.

At step 205, the set-top box then multiplies the received disparity average by one minus the scaling factor to obtain a shifting factor, which is then used at step 206 to laterally shift the left and right images of the stereoscopic image with respect to one another. The shifting factor can be considered as a content specific global shift value, because it provides a global shift, which is a shift of pixels of the image, with the amount of shift being based on the content or depth information of the stereoscopic image.

In the above-described embodiment of the invention, the left and right images are each shifted by half of the shifting factor with respect to one another such that the overall shift equals a shift according to the shifting factor. However, it will be appreciated that either the left or right image could be shifted by the whole shifting factor, or the shifting factor could be split between the left and right images in any appropriate ratio.

The stereoscopic image is pre-processed ready to be displayed on the display. In particular, the associated depth of the stereoscopic image is prepared such that, when the image is automatically scaled by being displayed on a display having a different size to the original target image display size of the original image data, the depth characteristics are not unduly distorted.

Figure 3:
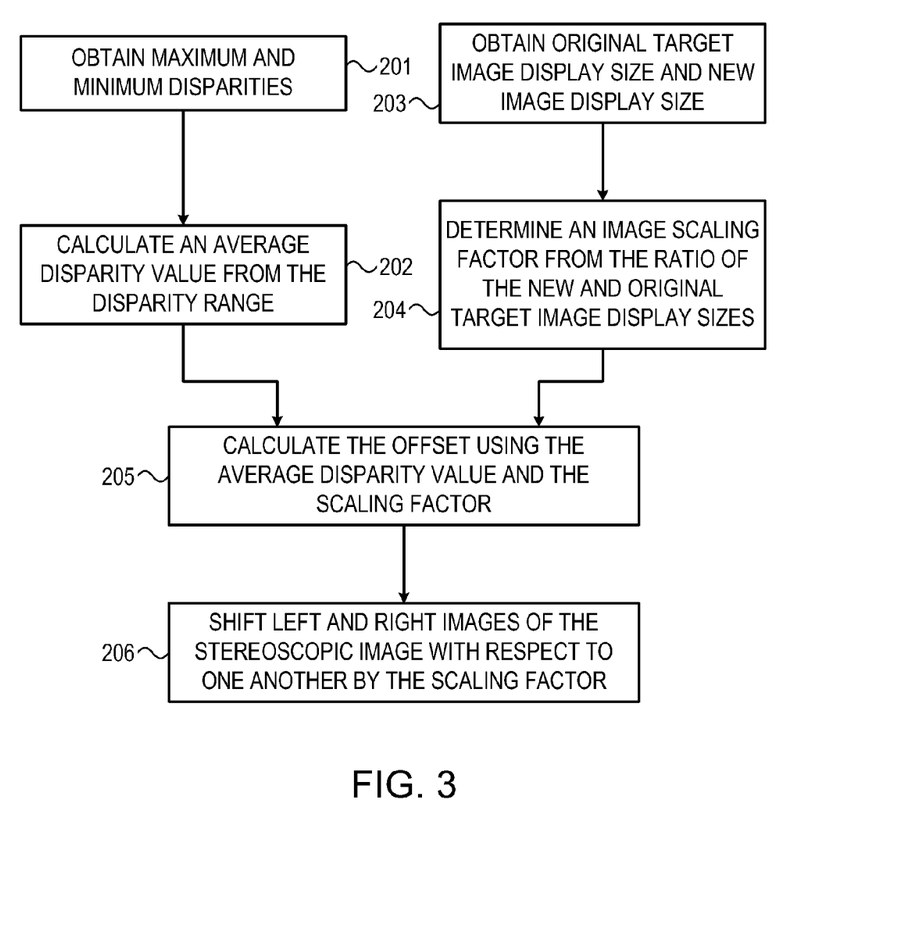
FIG. 3 is an illustration of a process performed by the system of FIG. 1 in accordance with an embodiment of the present invention.

The process depicted in FIG. 3 is then repeated for further stereoscopic image frames of an image stream. When processing an image stream the scaling factor typically remains the same, assuming the original target image display size and new display size do not change. Hence, the scaling factor can be stored in memory of the set-top box. If required, a simple periodic check can be carried out on the incoming image information to determine if there is a change in the original target image display size. In the event that the original target image display size does change, the scaling factor is typically recalculated.

Repeated changes of the global shift can be unpleasant to a viewer, and thus the set-top box may change the shift between video frames very slowly. However, there are certain points where a change in shift is more acceptable or desirable, such as at scene changes. Scene changes can be detected (e.g. by identifying a major difference in correlation between sequential images), and so can be included in the transmitted metadata to indicate points at which the global shift(s) can be altered more freely.

The set-top box 104 is provided with a receiving or input port that is connected to the receiver 103. The input port feeds received information to a processor of the set-top box. The processor is able to perform all of the above-mentioned processing, and utilises integrated memory devices for storing the information utilised during the processing steps of FIG. 3.

While in the above embodiment of the present invention the set-top box performs all of the processing, in alternative embodiments of the invention all of the processing is performed by the display. In yet further embodiments of the invention the display and set-top box may be integrated components and thus the processing is performed by shared processing components of the display and set-top box.

In yet further embodiments of the invention, more complex operations can be performed in order to better compensate for the errors in depth characteristics that occur when scaling stereoscopic images. These further embodiments are set out below.

For each of the further embodiments greater amounts of metadata can be used beyond the simple minimum and maximum disparity, up to and potentially including a full per pixel disparity map. The disparity maps may be sent as metadata accompanying the stereoscopic image information, or alternatively they may be generated by the set-top box.

In a first alternative embodiment of the present invention, the non-linearity of perceived depth when varying image size is compensated for by using methods for minimising the error in depth scaling over the range of depths. Many methods can be used for this. For example, iterative methods can be used to attempt to minimise the errors seen across the range.

For any given image or scene, each potential disparity or depth value may occur a given number of times (which may be zero), and this represents the usage count of that value. Thus a histogram (or similar) can be generated which represents the distribution of the usage of the different disparity (or depth) values. To be of use for the following stages, these values can typically be measured not in pixels but in fractions of the human eye separation. Thus, when the display size is scaled, and an offset is applied, this disparity (or depth) value usage histogram is changed. This is caused by two properties of the display size scaling; firstly the overall represented range from maximum to minimum is scaled resulting in a smaller or larger overall range (as we are no longer measuring in pixels but in fractions of a fixed size), and secondly the scaling of the image results in different usage counts for the values.

An iterative method can be used to compare the original and scaled offset histograms. Since only the offset may be varied, a different histogram can be generated for each offset value. This new histogram can be compared against the original histogram, and the best match can be used to select the desired offset. The comparison can use any of a range of mechanisms, such as the sum of absolute differences (SAD) or the least squares mechanisms.

As the importance of certain depths will vary, use of selective ranges of values can further improve the method. For instance a relatively flat scene background that is static (i.e. the maximum depth is not changing) may well not matter as much as the central character(s) of the scene. Thus further versions that exclude or minimise the importance of certain depth values (mostly likely to be a static background) would further alter the identified shift correction factor by excluding this depth value, or set of depth values from the overall correction. In many cases, this can be handled by excluding the furthest back values (i.e. the greatest positive disparity values) and optimising for the remaining values using the comparison outlined above, but operating on the reduced histogram data.

The embodiments described above provide a global shift to pixels of the stereoscopic image. In a further embodiment of the invention, the stereoscopic image is divided up into regions. A shift factor is determined for one or more regions, and each of the one or more regions is then shifted in accordance with its specific shifting factor. This embodiment of the invention shall now be described in more detail.

Firstly, the disparity map is obtained, either from metadata associated with the stereoscopic image or by generating the map by performing a disparity cross-correlation between the left and right images of the stereoscopic image. Then the stereoscopic image is split into regions by performing any of numerous methods such as object identification or region splitting or region growing. One simple method is to process the disparity map to reduce the number of values, for example by dividing all values by a given constant, such that, for example, the disparity map is reduced to binary values (0 or 1). The resultant disparity map is scanned from the top line downwards until a point is reached where the majority of the values change from a 1 to a 0 (or vice versa. From this, two regions, a "top half" and a "bottom half" are identified, and different offsets can be calculated for each half. Clearly, state of the art region identification, splitting or growing algorithms will produce significantly better regions that in turn will have better visual results.

Other non-content based region splitting techniques may also be utilized. In this case, the image is divided up into regions, such as 16×16 pixel blocks, and each block is its own region. Such techniques may break the image up into regions of similar disparity. It is noted that regions of similar disparity often correspond to a particular object of the image. Hence, this embodiment of the invention therefore effectively provides different shifts to different objects within the image.

For some forms of content, the generation process can easily provide region information for assets in the scene, or closely grouped assets in the scene. One mechanism for achieving this is to generate, for pixels in the image pair, the asset that is rendered in that pixel and placing this into an asset map of the same resolution as the image pair. This asset map can be processed further by grouping closely related assets (e.g. all the leaves on a tree). The asset map will then have a collection of regions identified by a common asset ID, and this can be used as a region map, or as an initial starting region map.

Once the image is split into regions the various techniques for determining a global shifting factor can be applied to one or more of the regions. Since the regions have similar disparities, errors in the new depth values are minimised.

Any of the techniques identified above can be used to identify the offset to be used for the region identified. When operating on a region and using the head-end to identify regions, the geometry of the region, as identified by the head-end processes just described, would be transmitted together with the required disparity information for the offset calculation mechanism.

Human depth perception is very accurate for objects that seem to be close to the viewer. However, as depth of objects increases, the accuracy of perception is reduced. Hence, in further embodiments of the invention, techniques for adjusting the depth can be applied which employ a degree of algorithmic complexity sufficient for the required accuracy of perception at that depth. A coding scheme for conveying the depth adjustment can be similarly designed.

In further embodiments of the present invention, the boundaries between regions can be smoothed. Performing smoothing reduces sudden changes in depth characteristics, which if not corrected for may look unnatural when displayed. Such smoothing can be achieved by applying curve-fitting techniques to disparity data that bridges regions.

There are numerous techniques from computer graphics that take a range of sample values and provide a range of methods for interpolating values and achieving behaviour equivalent to smoothing. Treating the offset value(s) as input values to a curve-fitting algorithm, such as (for example) the non-uniform rational B-spline (http://en.wikipedia.org/wiki/NURBS) can be used. Where such algorithms allow for further optional values to control the fitting, these values can take standard default values or could be controlled by further transmitted data. Those skilled in the art will appreciate that many alternative algorithms could be used to achieve the same effect.

While each of these more complex embodiments of the present invention may increase the processing requirements of the set-top box, it will be appreciated that such functionality could be implemented effectively by a standard Graphics Processing Unit (GPU) or alternatively by a silicon chip specifically designed for performing such functionality.

The embodiments described above utilise additional information to generate a shifting factor (or shifting factors) to be applied to the content. The value of the correction factor(s) are determined in conjunction with the scaling factor and hence in conjunction with the size of the display device. As such, each differently sized display device will generate a different shifting factor(s). In further embodiments, it may be desirable to limit the maximum shifting factor (positive or negative) to keep the content within a physiologically comfortable range, or retain a desired artistic effect. To this end, additional information can be transmitted that represents a maximum allowable shifting factor (positive or negative) that can be applied.

Each of the above mentioned embodiments of the invention have been described in accordance with the system as depicted in FIG. 1. The system of FIG. 1 relates to a standard television network, in which the three-dimensional image is transmitted through the air between a transmitter and receiver. However, it will be appreciated that the present invention could equally apply to a system in which satellite-based transmission is utilised, or the transmission is made over the Internet. Furthermore, while the set-top box and television are depicted as separate items, these could be integrated within a single unit, and if the images are sent over the Internet, the set-top box 104 and display 105 could be replaced by a computer.

In yet further embodiments of the invention, the stereoscopic image data is not received over a network but is instead received from a data storage device, such as a DVD. In such an embodiment, the storage device will typically store the stereoscopic image data in the form of an image stream. The storage device may also provide metadata relating to the original target image display size, as well depth information such as maximum and minimum depth values for one or more frames, or a depth map for one or more frames. In this further embodiment of the present invention, the functionality of the set-top box may be performed within the storage device reader, such as a DVD player, or within the display device itself. Furthermore, all of these functionalities may be incorporated in a computer.

While the above embodiments have been described with respect to use with televisions or computer monitors as the display device it will be appreciated that the present invention could be used with any display means, such as a mobile phone screen, or a cinema/projector screen.

In the above description, mechanisms for correcting depth perspective correction for two images were described. The same mechanisms can extend to multiple images, where different correction factors are applied to each image, or where they are interpolated between the images based on a knowledge of the relationship between the images.

The present invention can be implemented in dedicated hardware, using a programmable digital controller suitably programmed, or using a combination of hardware and software.

Alternatively, the present invention can be implemented by software or programmable computing apparatus. This includes any computer, or such like. The code for each process in the methods according to the invention may be modular, or may be arranged in an alternative way to perform the same function.

Each of the functionalities of the invention can in whole, or in part, be implemented by the combination of a processor and associated memory, or by a standard computer system. Furthermore, functions described herein as being implemented as part of a single unit may be provided separately, communicatively coupled across a network.

The present invention can encompass a carrier medium carrying machine-readable instructions or computer code for controlling a programmable controller, computer or number of computers as the apparatus of the invention. The carrier medium can comprise any storage medium such as a floppy disk, CD ROM, DVD ROM, hard disk, magnetic tape, or programmable memory device, or a transient medium such as an electrical, optical, microwave, RF, electromagnetic, magnetic or acoustical signal. An example of such a signal is an encoded signal carrying a computer code over a communications network, e.g. a TCP/IP signal carrying computer code over an IP network such as the Internet, or an intranet, or a local area network.

Throughout this document, reference to the depth of the three-dimensional image refers to the distance from the viewer to the point at which they perceive the object. Thus, an object that is perceived at the same location on the screen would have a depth that is equivalent to the distance to the screen. An object that is perceived behind the screen would have a greater depth, and an object that is perceived in front of the screen would have a lesser depth than the distance to the screen.

Reference to the maximum depth throughout this document refers to the perceived depth associated with the object that is perceived furthest from the viewer. This would normally, but not necessarily, be at or behind the screen.

Reference to the minimum depth throughout this document refers to the perceived depth of the object that is perceived closest to the viewer. This need not be in front of the screen, but it may be perceived as in front of the screen.

In a stereoscopic image pair discussed throughout this document, an object is represented at potentially different locations in the left and right images that make up the stereoscopic pair. The term disparity refers to a measure of the offset between these locations. Pixels will typically have a disparity value. A negative disparity means that the location of the object in the right image is to the left of the location of the object in the left image. This means that the object is perceived in front of the screen, or that the depth of the object is less than the depth of the screen, or that the object is closer to the viewer than the screen. A positive disparity means the opposite, and that the object is perceived behind the screen.

The disparity can be measured in pixels or, for a given display size, converted into a distance measurement in meters using the pixels per millimeter value for the display.

Reference to the maximum disparity is referring to the disparity with the largest positive value, and corresponds to the object that is the furthest from the viewer.

Reference to the minimum disparity refers to the mathematical minimum value of the disparity values, i.e. it is the value with the most negative value, or if no negative values are present, it is the smallest positive value (treating zero as the smallest possible positive value).

The disparity domain is the domain in which the offset of the images of the stereoscopic image are considered in pixels per millimeter. In contrast, the depth domain is the domain in which the perceived depth of the images of the stereoscopic image is considered in terms of distance from the viewer.

When reference is made throughout this document to an object being behind the screen, this means that due to the characteristics of the stereoscopic pair, the object is perceived as being on the opposite side of the screen to that of the viewer. Conversely, reference to an object being in front of the screen refers to an object that is perceived as being closer to the viewer than the screen.

It is appreciated that various features of the invention that are, for clarity, described in the contexts of separate embodiments may also be provided in combination in a single embodiment. Conversely, various features of the invention that are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims.

What is claimed is:

1. A method for adjusting depth characteristics of a three-dimensional image for correcting for errors in perceived depth when scaling the three-dimensional image, the method comprising:

receiving three-dimensional image information comprising a stereoscopic image including a first image and a second image, the stereoscopic image having depth characteristics associated with an offset of the first and second images;

determining a scaling factor indicative of a scaling for converting the stereoscopic image from an original target size to a new size;

determining a shifting factor for varying the depth characteristics, the shifting factor indicative of a relative shift to be applied between the first and the second images, wherein the shifting factor is determined in accordance with the scaling factor and at least one depth parameter derived from the depth characteristics; and performing the relative shift between the first and second images in accordance with the shifting factor for adjusting the offset of the first and second images;

wherein the at least one depth parameter used to determine the shifting factor relates to a variation in the depth of the stereoscopic image;

wherein the variation corresponds to an average variation in the depth of the stereoscopic image; and wherein the average variation is determined in a depth domain and transformed to a disparity domain for determining the shifting factor.

2. The method according to claim 1, wherein the average variation is determined in accordance with the following equation:

$$\left(\frac{\text{maximum disparity} + \text{minimum disparity}}{2}\right) \times (1 - \text{scaling factor})$$

wherein the disparity is a measure of an offset between a pixel in the first and second images of the stereoscopic image.

3. The method according to claim 1, wherein the shifting factor is determined by an iterative process for minimizing errors in the offset of the first and second images of the stereoscopic image when scaling the stereoscopic image.

4. The method according to claim 3, wherein the iterative process utilizes information related to usage of different depth values.

5. The method according to claim 1, wherein the at least one depth parameter used to determine the shifting factor includes a parameter indicating a most common depth of the depth characteristics of the stereoscopic image.

6. The method according to claim 1, wherein the three-dimensional image information includes the at least one depth parameter.

7. The method according to claim 1, wherein the stereoscopic image comprises a plurality of regions and the step of determining the shifting factor further comprises determining a shifting factor for one or more of the regions, and the step of performing a relative shift further comprises performing a relative shift for each of the one or more regions in accordance with the shifting factor determined for each respective one or more region.

8. The method according to claim 7, wherein the step of determining the shifting factor further comprises splitting the stereoscopic image into regions.

9. The method according to claim 7, wherein the three-dimensional image information includes information defining the regions of the stereoscopic image.

10. The method according to claim 7, further comprising performing a smoothing operation on boundaries between regions.

11. The method according to claim 10, wherein the smoothing operation involves low-pass filtering.

12. The method according to claim 1 further comprising:
receiving further three-dimensional image information comprising a further stereoscopic image including a first image and a second image, the further stereoscopic image having depth characteristics associated with an offset of the first and second images of the further stereoscopic image, wherein the stereoscopic image and the further stereoscopic image correspond to frames of a stream of image information and the further stereoscopic image corresponds to a frame of the stream preceding the further stereoscopic image; and performing a smoothing operation on the depth characteristics in order to smooth the transition of depth characteristics between frames.

13. The method according to claim 12, wherein the smoothing operation comprises applying a low pass filter to the depth information.

14. The method according to claim 1, wherein the depth parameters are determined in accordance with a depth map included in the three-dimensional image information, the depth map indicating a relative offset between the first and the second images at a plurality of points across the stereoscopic image.

15. The method according to claim 1, further comprising generating a depth map from the stereoscopic image, wherein the depth parameters are determined in accordance with the depth map, the depth map indicating a relative offset between the first and the second images at a plurality of points across the stereoscopic image.

16. The method according to claim 1, wherein the three-dimensional image information is received over a network from a head-end.

17. The method according to claim 1, wherein the first and second images are each shifted relative to one another by half of the shifting factor for correcting depth perception due to scaling of the three-dimensional image.

18. An apparatus for adjusting depth characteristics of a three-dimensional image for correcting for errors in perceived depth when scaling the three-dimensional image, the apparatus comprising:

an input port arranged to receive three-dimensional image information comprising a stereoscopic image including a first image and a second image, the stereoscopic image having depth characteristics associated with an offset of the first and second images; and a processor arranged to:
determine a scaling factor indicative of a scaling for converting the stereoscopic image from an original target size to a new size;

determine a shifting factor for varying the depth characteristics, the shifting factor indicative of a relative shift to be applied between the first and the second images, wherein the shifting factor is determined in accordance with the scaling factor and at least one depth parameter derived from the depth characteristics; and perform the relative shift between the first and second images in accordance with the shifting factor for adjusting the offset of the first and second images;

wherein the at least one depth parameter used to determine the shifting factor relates to a variation in the depth of the stereoscopic image;

wherein the variation corresponds to an average variation in the depth of the stereoscopic image; and wherein the processor determines the average variation in a depth domain and transforms the average variation to a disparity domain for determining the shifting factor.

19. The apparatus according to claim 18, wherein the processor determines the average variation in accordance with the following equation:

$$\left(\frac{\text{maximum disparity} + \text{minimum disparity}}{2}\right) \times (1 - \text{scaling factor})$$

wherein the disparity is a measure of an offset between a pixel in the first and second images of the stereoscopic image.

20. The apparatus according to claim 18, wherein the processor determines the shifting factor by an iterative process for minimizing errors in the offset of the first and second images of the stereoscopic image when scaling the stereoscopic image.

21. The apparatus according to claim 20, wherein the iterative process utilizes information related to usage of different depth values.

22. The apparatus according to claim 18, wherein the at least one depth parameter used to determine the shifting factor includes a parameter indicating a most common depth of the depth characteristics of the stereoscopic image.

23. The apparatus according to claim 18, wherein the three-dimensional image information includes the at least one depth parameter.

24. The apparatus according to claim 18, wherein the stereoscopic image comprises a plurality of regions and the processor determines a shifting factor for one or more of the regions, and performs the relative shift for each of the one or more regions in accordance with the shifting factor determined for each respective one or more region.

25. The apparatus according to claim 24, wherein the processor determines the shifting factor by splitting the stereoscopic image into regions.

26. The apparatus according to claim 24, wherein the three-dimensional image information includes information defining the regions of the stereoscopic image.

27. The apparatus according to claim 24, wherein the processor is further arranged to perform a smoothing operation on boundaries between regions.

28. The apparatus according to claim 27, wherein the smoothing operation involves low-pass filtering.

29. The apparatus according to claim 18, wherein the processor is further arranged to:
receive further three-dimensional image information comprising a further stereoscopic image including a first image and a second image, the further stereoscopic image having depth characteristics associated with an offset of the first and second images of the further stereoscopic image, wherein the stereoscopic image and the further stereoscopic image correspond to frames of a stream of image information and the further stereoscopic image corresponds to a frame of the stream preceding the further stereoscopic image; and
perform a smoothing operation on the depth characteristics in order to smooth the transition of depth characteristics between frames.

30. The apparatus according to claim 29, wherein the smoothing operation comprises applying a low pass filter to the depth information.

31. The apparatus according to claim 18, wherein the processor determines the depth parameters in accordance with a depth map included in the three-dimensional image information, the depth map indicating a relative offset between the first and the second images at a plurality of points across the stereoscopic image.

32. The apparatus according to claim 18, wherein the processor is further arranged to generate a depth map from the stereoscopic image, wherein the depth parameters are determined in accordance with the depth map, the depth map indicating a relative offset between the first and the second images at a plurality of points across the stereoscopic image.

33. The apparatus according to claim 18, wherein the three-dimensional image information is received over a network from a head-end.

34. The apparatus according to claim 18, wherein the processor is arranged to shift the first and second images relative to one another by half of the shifting factor for correcting depth perception due to scaling of the three-dimensional image.

35. An apparatus for adjusting depth characteristics of a three-dimensional image for correcting for errors in perceived depth when scaling the three-dimensional image, the apparatus comprising:
means for receiving three-dimensional image information comprising a stereoscopic image including a first image and a second image, the stereoscopic image having depth characteristics associated with an offset of the first and second images; and
means for determining a scaling factor indicative of a scaling for converting the stereoscopic image from an original target size to a new size;
means for determining a shifting factor for varying the depth characteristics, the shifting factor indicative of a relative shift to be applied between the first and the second images, wherein the shifting factor is determined in accordance with the scaling factor and at least one depth parameter derived from the depth characteristics; and
means for performing the relative shift between the first and second images in accordance with the shifting factor for adjusting the offset of the first and second images;
wherein the at least one depth parameter used to determine the shifting factor relates to a variation in the depth of the stereoscopic image;
wherein the variation corresponds to an average variation in the depth of the stereoscopic image; and
wherein the means for determining the shifting factor determines the average variation in a depth domain and transforms the average variation to a disparity domain for determining the shifting factor.

* * * * *